Patented July 30, 1940

2,209,333

UNITED STATES PATENT OFFICE 2,209,333

METHOD OF PRODUCING RUBBERLIKE COMPOSITIONS FROM PETROLEUM HYDROCARBONS

Edgar W. Hultman, Larchmont, N. Y., assignor to The Hultene Rubber Corporation, New York, N. Y., a corporation of Delaware No Drawing. Application April 3, 1936, Serial No. 72,566

8 Claims. (Cl. 260—82)

This invention relates to a procedure for refining hydrocarbon materials and to a product or composition resulting from such procedure. More particularly, it relates to a process for the treatment of petroleum distillates and to a rubberlike mass or composition obtained thereby, and includes correlated improvements and discoveries whereby the removal of various impurities may be enhanced with obtainment of a novel product.

It is a general object of the invention to provide a process for the treatment of hydrocarbon materials in which impurities existing as gums and potential gum forming substances, are removed by a procedure which is economical and may be practised readily and efficiently on a commercial basis.

Another object of the invention is to provide a process whereby hydrocarbon distillates are treated with a medium derivable by electroylsis of an aqueous solution of an acid and with chlorine so that undesirable substances are converted into valuable products and rendered capable of ready separation from the thus treated distillate.

Still another object of the invention is the provision of a process in which an impure hydrocarbon is treated with an electrolyzed sulphuric acid medium and with chlorine which effects conversion of impurities into a form or forms that are novel rubberlike substances which may be easily eliminated.

A further object is to provide a procedure in accordance with which a hydrocarbon distillate, such as a cracked petroleum distillate, is treated with an electrolyzed aqueous solution of a sulphuric acid containing a phosphate radical and with chlorine whereby there is obtained a purified distillate which is stable, of marked brilliancy, pleasant odor, and substantially colorless. This is occasioned by removal from the distillate of those components which give rise to objectionable odors and discoloration and which render the product unstable and lead to the formation of gummy or resinous products when the distillate is utilized as in the operation of an internal combustion engine, such components being preponderatingly converted in a rubberlike mass.

Additional objects of the invention are the provision of a process whereby petroleum or hydrocarbon distillates are rendered substantially free from gums, resinous compounds and compounds leading to the formation of gums and resins without a substantial destruction of the benzol equivalent and octane number constituents, so that these constituents are conserved and yield a product of high value; whereby recovery of the impurities or resinous substances may be accomplished so that these substances may be subsequently utilized either per se or following a suitable treatment for the manufacture of various materials, and whereby the hydrocarbon material may be purified without substantial loss of useful hydrocarbon material or of the refining agent, thus giving a greater volume of purified product and making possible a more efficacious use of the refining agent.

Other objects of the invention will in part be obvious and will in part appear hereinafter.

The invention accordingly comprises the several steps and the relation of one or more such steps with respect to each of the others and the compositions possessing the features, properties, and relation of constituents which are exemplified in the following detailed disclosure and the scope of the invention will be indicated in the claims.

In the practise of the invention, a refining of a hydrocarbon material may be effected whereby gums and resins, or gummy or resinous substances which possess the property of undergoing change with the formation of gummy and/or resinous masses; that is, potential gum forming materials are rendered capable of ready removal by treatment of the hydrocarbon material with a medium derivable by electrolysis of an aqueous solution of an acid and a chlorinating agent, and more particularly with an electrolyzed acid medium and chlorine. Treatment of the hydrocarbon with an electrolyzed acid and chlorine may be accomplished simultaneously with the preparation of the acid, the electrolyzed acid medium being preferably an aqueous solution of sulphuric acid which is being subjected to the influence of an electric current, such acid having a concentration of 10 to 60%, especially about 20% sulphuric acid. The chlorine may be introduced into the acid medium as such, or may be formed therein through introduction of a suitable chloride as sodium, hydrogen and potassium chlorides, which form chlorine by electrolysis.

When the production of the electrolyzed acid and the treatment of the hydrocarbon are carried on separately, utilization may also be made of a compound containing a phosphate radical as a stabilizing agent; that is, an ortho, meta, or pyro phosphate radical. Such radical may be introduced in the form of a phosphoric acid, preferably ortho phosphoric acid, or in the form of a salt containing the desired radical. It is considered that the introduction of a salt leads to the formation of the corresponding phosphoric acid due to reaction with the sulphuric acid. When a phosphoric radical is present, as in the form of ortho phosphoric acid, the acid strength of the electrolyzed medium is preferably substantially equivalent to about 20% sulphuric acid.

The electrolyzing action may be carried out in a suitable electrolyzer which may comprise an outer non-porous, non-conductive receptacle, and an inner porous septum or cup, there being a substantial spacing apart of the outer and inner vessels.

Electrodes are positioned within the outer and inner compartments of the electrolyzer and the acid medium to be electrolyzed and thereby form the refining agent is placed within the porous cup or septum. The space between the porous cup and outer vessel contains acid of somewhat lower concentration or acid strength; thus the outer vessel may consist of a glass jar, or beaker, within which there is positioned a porous cup. Within the porous cup is an anode preferably platinum and in the space between the cup and the jar is placed a cathode, for example, lead. The anode and cathode are connected to a suitable source of electrical energy, as a battery or direct current generator. A sulphuric acid of 20% strength containing a chloride may be placed within the porous cup and a sulphuric acid of about 15% in the space without the porous cup, following which electrolysis is effected by passing through the acid solutions a current of from 4 to 16 amperes, preferably about 15 amperes under a voltage of about 2 to 8 volts, preferably about 2 volts.

The electrolyzing action should be conducted in a manner such that the temperature is not permitted to rise substantially above 40° F. and this may be brought about by placing the electrolyzing vessel in a cooling bath or medium as a cold brine. During electrolysis a chlorination of gums, or gummy or resinous substances is accomplished by the introduction of chlorine into the medium or by the release of chlorine therein.

When a compound containing a phosphate radical is to form a part of the refining agent, then there is placed within the porous cup a mixture of sulphuric acid and phosphoric acid, such mixture preferably having an acid strength substantially equal to about 20% sulphuric acid. The treatment of the hydrocarbon material may be brought about either by conducting the hydrocarbon into the electrolyzed acid, while it remains in the porous cup and during the electrolysis, or following removal of the electrolyzed acid, whereupon the hydrocarbon may be intimately admixed therewith as by suitable agitation.

The hydrocarbon material undergoing treatment may be a petroleum distillate, as gasoline, engine distillates, kerosene, naphtha, pressure or cracked distillates, and like products. Subsequent to treatment of the material with an electrolyzed acid medium as 20% sulphuric acid and with chlorine, the mass is subjected to distillation to obtain a desired product, as a gasoline having a 400° F. end point. The residue may then be further treated to effect separation of the rubberlike substances therefrom and the residual mass thus obtained introduced into the charging stock or fuel oil stock.

As an illustrative embodiment of a manner in which treatment of a hydrocarbon material may be effected, the following examples are presented:

*Example 1.*—An electrolytic cell may be constructed of suitable capacity having an outer or principal container of non-conducting material, as glass, and positioned therein is a porous septum, as a porous cup, whereby the container is divided into two compartments; thus the container may have a capacity of about 80 liters, and the porous septum or cup about one-half thereof, or 40 liters. A platinum electrode is placed within the porous cup and a lead electrode within the space between the porous cup and the container; that is, between the outside wall of the cup and the inner wall of the container. The platinum electrode is connected to the positive terminal and the lead electrode to the negative terminal of a source of direct electric current. Thus, the compartment within the porous cup becomes an anode chamber and that between the cup and the container a cathode chamber.

Within the cup, there is placed a suitable quantity of an acid medium, as 30 liters of 20% sulphuric acid. In the cathode chamber, there is placed an equal amount of about 15% sulphuric acid. A current of from 2 to 8 volts having an amperage of 4 to 6 amperes is then passed through the solution effecting a marked change in the acid contained in the anode chamber. There may now be introduced into the anode chamber and at the bottom thereof by means of suitable tubes or pipes chlorine and about 10 liters of a pressure or cracked distillate. The oil rises through the acid containing chlorine, and is treated thereby with the result that coagulation of gums and conversion of potential gum forming substances into a rubberlike mass is effected.

The oil which has risen to the surface of the acid may be removed at suitable intervals or continuously by means of a pipe or tube. The temperature of the anode chamber or the treating chamber should preferably not exceed 40° F. The maintenance of this temperature may be brought about by placing the electrolytic cell in a bath containing a cold brine or other cooling medium, as ice.

The oil, subsequent to its treatment, may be subjected to distillation whereupon the rubberlike masses remain within the residue and may be separated therefrom. Further, the acid which has been utilized to treat the oil may be used repeatedly with little loss.

*Example 2.*—The form of cell, capacity, and arrangement and operation are the same as given under Example 1. Instead of 20% sulphuric acid, however, the acid medium consists of about two-thirds (by volume) of 20% sulphuric acid, and one-third (by volume) of 20% phosphoric acid. This gives a medium having an acid strength substantially equivalent to 20% sulphuric acid. Furthermore, a treatment of the hydrocarbon with the mixed acid in which the phosphoric acid appears to act as a stabilizing agent for the electrolyzed sulphuric acid may be and preferably is carried out by removing the electrolyzed acid from the electrolytic cell and admixing thoroughly with the hydrocarbon by rather vigorous agitation while introducing chlorine thereinto. The oil so treated may then be distilled and the acid reactivated by placement in the electrolytic cell and again electrolyzed. It will be realized that in this example, as in Example 1, the contact of the oil or distillate with the electrolyzed acid medium may be either as a batch or as a continuous procedure.

It is rather generally appreciated that the undesirable substances present in various oil products, as pressure distillates, are of a resinous and/or gummy type and may consist of olefin hydrocarbons comprising mono, di, poly-olefins and acetylene isomers of di-olefins, naphthenes, sulphur, nitrogen and acid compounds. Previous attempts to remove the undesirable substances have been primarily a first treatment with sulphuric or other acid, washing the thus treated distillates with water followed by a washing with an alkali, for example, caustic soda, or sodium carbonate, or sodium plumbite, whereby the acid is neutralized and naphthenes are removed and then passing the treated material through a clay or other suitable earthy absorbent filter. The final product so obtained may also be subjected to a redistillation. This practise is attended by certain disadvantages as a rather considerable waste of distillates, a loss of the substances removed by the acid and alkali treatments, loss of the acids and alkalies and filtering media utilized, and a destruction of the benzol equivalent and octane number components of the material treated.

It will be realized that if these components are retained a product possessing more desirable properties, especially as a motor fuel, will be obtained.

By the foregoing treatment, the various disadvantages just enumerated are wholly or at least in a large measure obviated and there is obtained, for example, a gasoline which is of pleasant odor, substantially colorless, brilliant and stable over rather extended periods of time. Furthermore, the benzol equivalent and octane number components are not materially affected by the treatment and hence will be found in the finished product in amounts substantially equivalent to those originally present in the untreated distillate. In addition, the reactivation of the treating medium with its repeated utilization leads to a decided economy inasmuch as it will be necessary to replace only that small amount of acid which may be carried along in the oil product. This, it will be realized is and will be comparatively a small amount.

The rubberlike substance or mass obtained by the simultaneous treatment of an impure hydrocarbon material with an electrolyzed acid medium and with chlorine as characterized by means substantially transparent and having a color which may range from gray or light tan to dark brown, is unaffected by weak acids and by strong or weak alkalies, is darkened and charred when treated with concentrated sulphuric acid at 66° Bé., is not affected by concentrated nitric acid nor by aqua regia, it possesses high elasticity either per se or when compounded with the usual rubber ingredients, is insoluble in water and aqueous mixtures, acetones, alcohol, acetone-nitric acid, alcohol-ether, benzene, petroleum distillates, toluene, xylenes, carbon-disulphide, carbon-tetrachloride, either separately or in compatible admixtures.

Further, the rubberlike mass as above indicated may be readily compounded with the various and usual rubber compounding ingredients as carbon black, zinc oxide, antimonious sulphides, coloring matters, e. g., pigments, and when mixed with sulphur in an amount up to about 10% and heated to a temperature of about 250° F. it is transformed into a substantially hard non-elastic and non-resilient material. This material resembles somewhat a hard rubber produced by heating rubber with a considerable amount of sulphur.

Emulsions containing the rubberlike mass may be readily formed in which said mass is contained in the dispersed phase. Such emulsions may be produced in any suitable type of emulsifying apparatus, as more particularly, a Jordan engine. They are preferably formed through the utilization of a fatty acid composition. This composition may be a fatty acid or mixture of such acids or derivatives thereof, as sodium, potassium, and ammonium salts, more especially the sodium salts of oleic, stearic, palmitic, lauric, and like fatty acids may be used, for example, sodium oleate, sodium stearate, or sodium palmitate. Instead of adding the fatty acid salts they may be formed in situ by having present in the sodium to be emulsified the desired fatty acid or fatty acids and adding thereto a suitable neutralizing agent, as sodium hydroxide, potassium hydroxide, or ammonium hydroxide, and these additions may be made either prior to or during the formation of the emulsion.

By way of example, a quantity of the rubberlike substance may be placed in a Jordan engine, together with an aqueous solution of sodium oleate. The engine may then be started and the emulsion formed through the operation thereof. During the emulsifying action, it is desirable to add a small amount of an alkali, as ammonium hydroxide, sodium hydroxide, or potassium hydroxide, preferably a small amount of ammonium hydroxide is added and such addition must be in an amount to give a balancing among the ingredients, whereby a stable emulsion is obtained. Addition of the alkali during the preparation of the emulsion facilitates its formation. Emulsions so formed are adapted for use in the production of a variety of articles, for example, sheets, bars, blocks, etc. Also the emulsions may be admixed with various compounding materials and then formed into desired shapes, as sheets and bars. It may be added that the rubberlike mass lends itself to manufacturing operations in quite the same manner as does rubber. Thus, it may by like procedures be milled, compounded, and shaped. Furthermore, the rubberlike substance finds an important use as a constituent of coating compositions, as paints, lacquers, and impregnating compounds. Coating compositions of this character may be produced by combining the rubberlike mass with glue, shellac, and an ethanolamine, for example, mono, di, or triethanolamine, or admixtures thereof.

The rubberlike mass may be admixed in substantially all proportions, the definite proportion being governed or controlled by the use that is to be made of the composition. As illustrative, 25 parts of glue may be dissolved in water. To the solution thus obtained, there may be added 25 parts triethanolamine and following admixture thereof there may be introduced 25 parts of shellac. Generally, the amount of triethanolamine should be that which is sufficient to retain the shellac in solution.

It will be realized that shellacs vary in their composition and solubility characteristics and hence a greater or smaller amount of triethanolamine may be required. Usually and preferably the glue, shellac, and ethanolamine are utilized in substantially equal amounts. Following production of the glue, shellac, ethanolamine solution, there may then be added an amount of the rubberlike mass which will give the desired properties, as water resistance. This amount may be from 5 to 60% of the combined amount of glue, shellac, and ethanolamine. Satisfactory results have been obtained with only 5% of the mass. The coatings are oil resistant as well as water resistant. Furthermore, the amount of rubberlike mass added in producing the coating composition is not limited to a maximum of 60%. Rather, said mass is miscible in practically all proportions and hence such amount may be added as is sufficient to give the properties desired. The paint, lacquer, or impregnating compositions prepared in the foregoing manner may be applied to any surface for which protection is sought, as wood, glass, metals, ceramics, textiles, paper, etc. The coating clings tenaciously to the surface and imparts thereto a marked property of water resistance.

Since certain changes in carrying out the above process and certain modifications in the composition which embody the invention may be made without departing from its scope, it is intended that all matter contained in the above description shall be interpreted as illustrative and not a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. A process for the treatment of hydrocarbons which comprises producing a rubberlike mass by subjecting an impure petroleum hydrocarbon material containing potential gum-forming compounds to treatment simultaneously with a liquid medium derivable by electrolysis of an aqueous solution of an oxidizing acid and with a chlorinating agent.

2. A process for the treatment of hydrocarbons which comprises producing a rubberlike mass by subjecting an impure petroleum hydrocarbon material containing potential gum-forming compounds to treatment simultaneously with an electrolyzing aqueous solution of an oxidizing acid and with chlorine.

3. A process for the treatment of hydrocarbons which comprises producing a rubberlike mass by subjecting an impure petroleum hydrocarbon material containing potential gum-forming compounds to treatment simultaneously with an electrolyzed aqueous solution of sulphuric acid and with chlorine.

4. A process for the treatment of hydrocarbons which comprises producing a rubberlike mass by subjecting an impure petroleum hydrocarbon material containing potential gum-forming compounds to treatment simultaneously with an electrolyzed aqueous solution of sulphuric acid having an acid strength of about 20% and with chlorine.

5. A process for the treatment of hydrocarbons which comprises producing a rubberlike mass by subjecting an impure petroleum hydrocarbon material containing potential gum-forming compounds to treatment simultaneously with an electrolyzed aqueous solution of sulphuric acid in the presence of a phosphoric acid and with chlorine.

6. A process for the treatment of hydrocarbons which comprises producing a rubberlike mass by subjecting an impure petroleum hydrocarbon material containing potential gum-forming compounds to treatment simultaneously with an electrolyzed aqueous solution of sulphuric acid in the presence of ortho phosphoric acid, the acid strength being substantially equivalent from 10% to 60% sulphuric acid and with chlorine.

7. A process for the treatment of hydrocarbons which comprises producing a rubberlike mass by agitating a cracked petroleum distillate containing potential gum-forming compounds with an electrolyzed aqueous solution of sulphuric acid containing ortho phosphoric acid, the acid strength being substantially equivalent to 20% sulphuric acid and simultaneously reacting with chlorine.

8. As a composition of matter, a rubberlike mass having the following apparent properties, substantially transparent, color ranging from gray and light tan to dark brown, unaffected by weak acids and by strong and weak alkalies, darkens and chars with 66° Bé., sulphuric acid, unaffected by concentrated nitric acid and aqua regia, high elasticity, and insoluble in water, aqueous mixtures, acetone, alcohols, benzene, petroleum distillates, toluene, xylene, carbon disulphide, and carbon tetrachloride and compatible admixtures thereof, said mass having been produced by subjecting an impure petroleum hydrocarbon material containing potential gum forming compounds to simultaneous treatment with a liquid medium derived by electrolysis of an aqueous solution of an oxidizing acid and with chlorine.

EDGAR W. HULTMAN.